Figure 1:
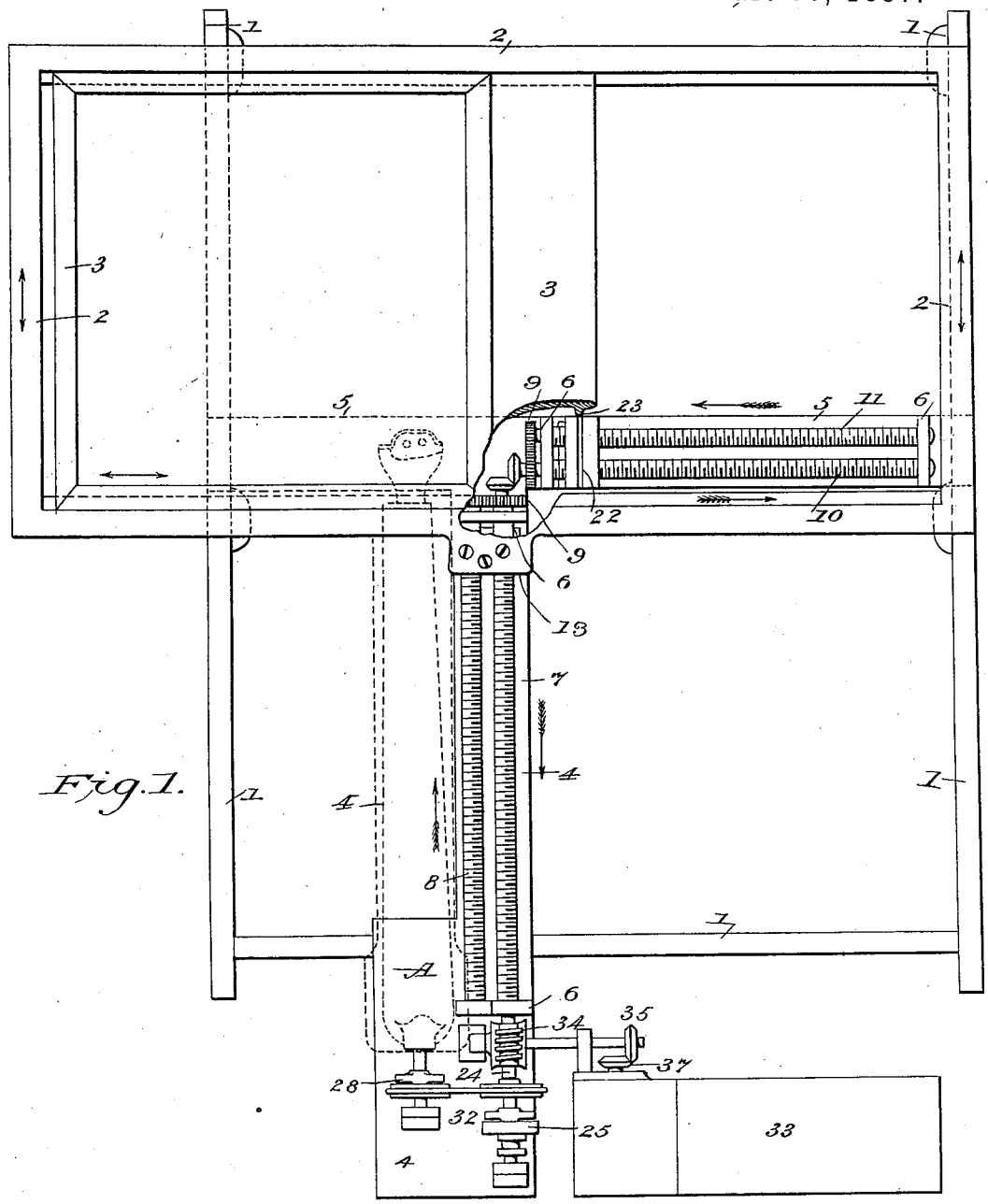

(No Model.) 12 Sheets—Sheet 2.

A. STEWARD & G. H. DIMOND.
FEEDING MECHANISM FOR QUILTING MACHINES.

No. 579,614. Patented Mar. 30, 1897.

Witnesses.
E. L. Smith
(Claes Fab. Strandberg)

Inventors.
Aurelius Steward,
George H. Dimond.

(No Model.) 12 Sheets—Sheet 3.

A. STEWARD & G. H. DIMOND.
FEEDING MECHANISM FOR QUILTING MACHINES.

No. 579,614. Patented Mar. 30, 1897.

(No Model.) 12 Sheets—Sheet 4.

A. STEWARD & G. H. DIMOND.
FEEDING MECHANISM FOR QUILTING MACHINES.

No. 579,614. Patented Mar. 30, 1897.

Witnesses.
E. L. Smith
Claes Fah Strandberg

Inventors:
Aurelius Steward,
George H. Dimond.

(No Model.) 12 Sheets—Sheet 5.

A. STEWARD & G. H. DIMOND.
FEEDING MECHANISM FOR QUILTING MACHINES.

No. 579,614. Patented Mar. 30, 1897.

Witnesses.
E. L. Smith
Claus Fabr Strandberg

Inventors.
Aurelius Steward,
George H. Dimond.

(No Model.) 12 Sheets—Sheet 6.
A. STEWARD & G. H. DIMOND.
FEEDING MECHANISM FOR QUILTING MACHINES.
No. 579,614. Patented Mar. 30, 1897.
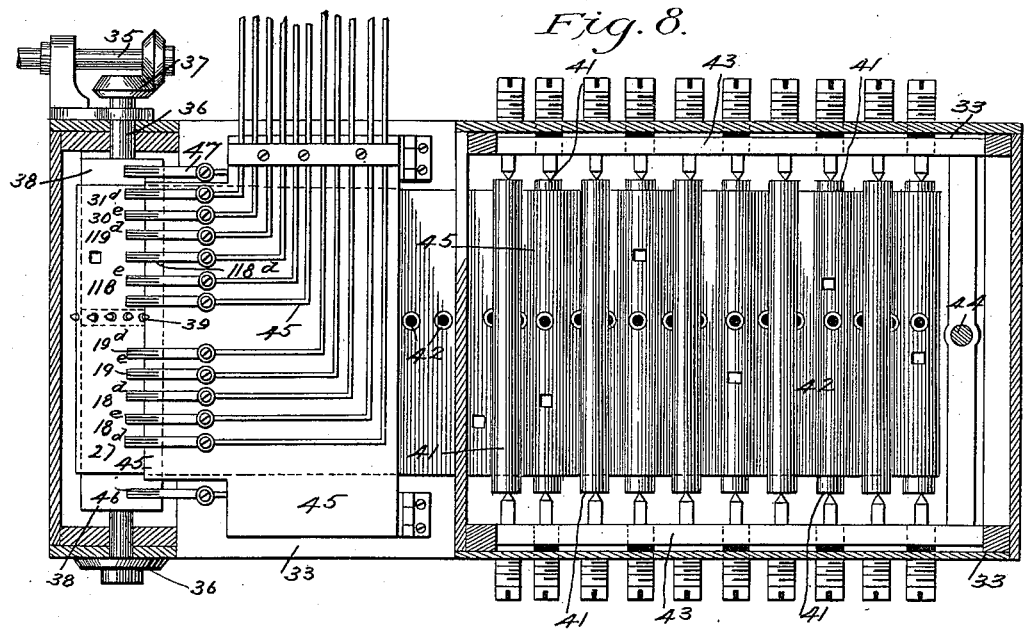
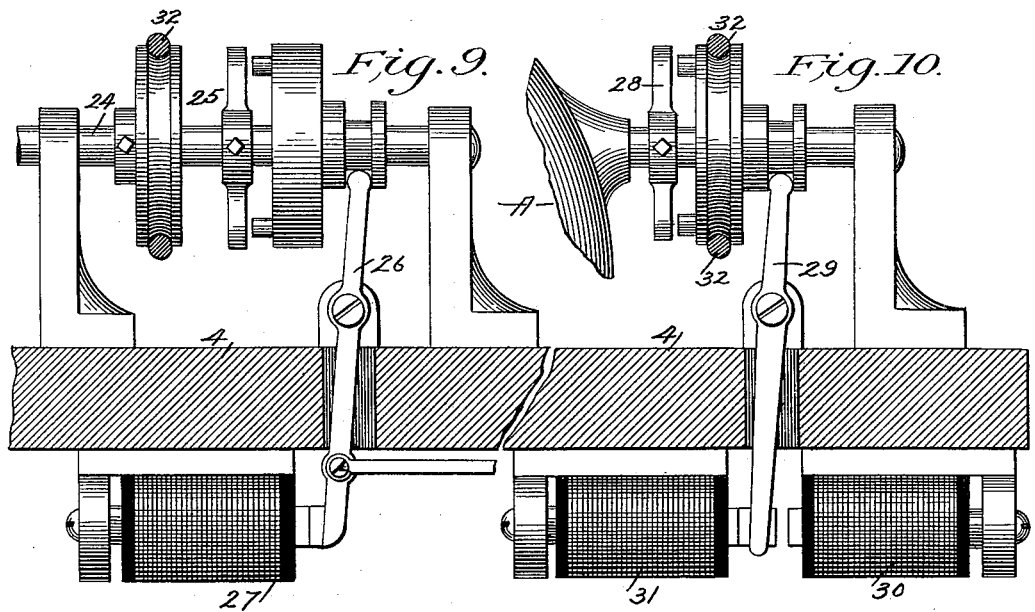
Witnesses.
E. L. Smith
Claus Gabr Strandberg
Inventors.
Aurelius Steward,
George H. Dimond.

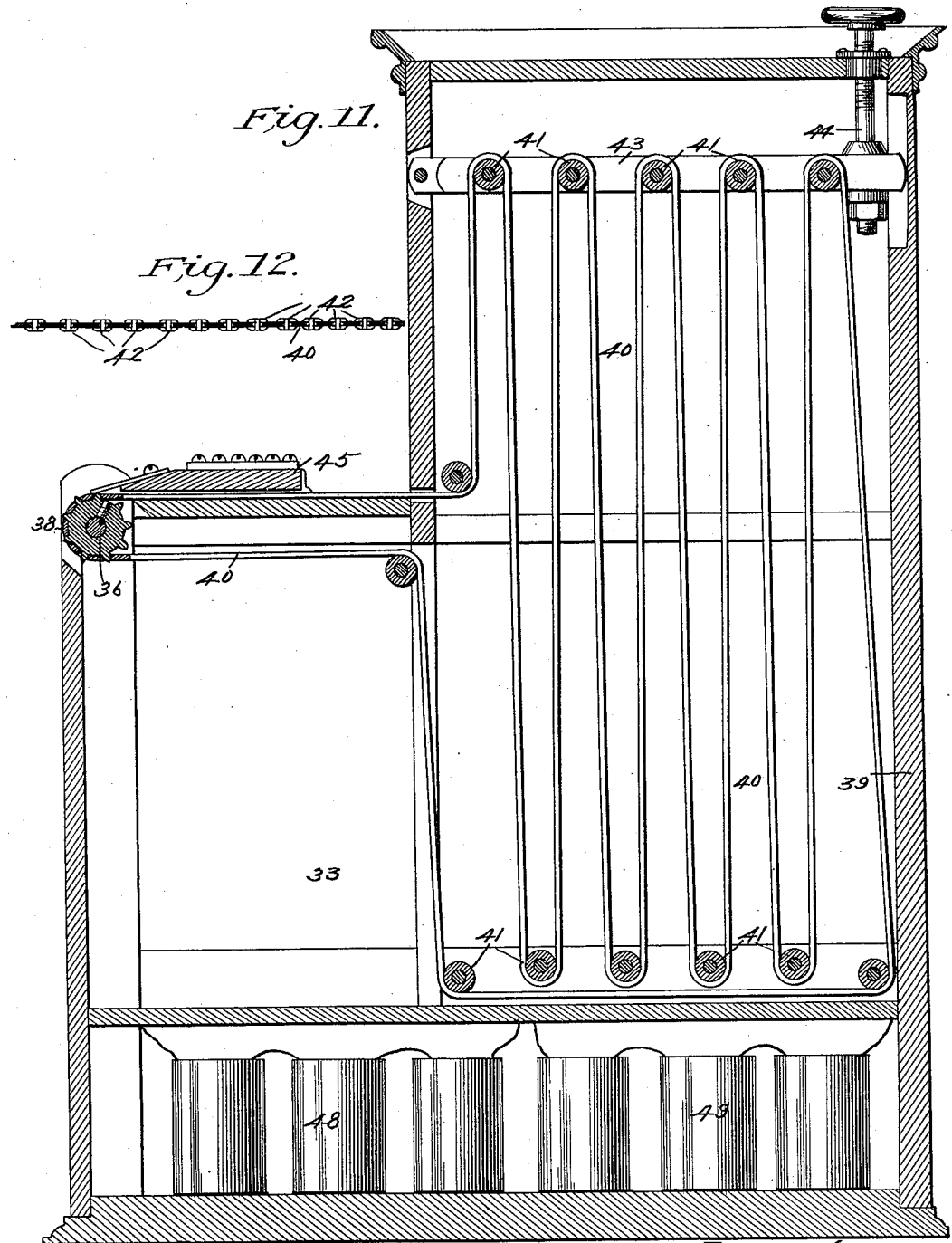

(No Model.) 12 Sheets—Sheet 8.

A. STEWARD & G. H. DIMOND.
FEEDING MECHANISM FOR QUILTING MACHINES.

No. 579,614. Patented Mar. 30, 1897.

Witnesses.
E. L. Smith
Claes Fabr Strandberg

Inventors.
Aurelius Steward
George H Dimond (No Model.)  12 Sheets—Sheet 9.

A. STEWARD & G. H. DIMOND.
FEEDING MECHANISM FOR QUILTING MACHINES.

No. 579,614.  Patented Mar. 30, 1897.

Witnesses.
E. L. Smith
Claus Gab. Strandberg

Inventors.
Aurelius Steward,
George H. Dimond.

(No Model.) 12 Sheets—Sheet 10.
A. STEWARD & G. H. DIMOND.
FEEDING MECHANISM FOR QUILTING MACHINES.
No. 579,614. Patented Mar. 30, 1897.

Witnesses.
E. L. Smith
Claus Fabr Strandberg

Inventors.
Aurelius Steward,
George H. Dimond.

(No Model.) 12 Sheets—Sheet 11.

A. STEWARD & G. H. DIMOND.
FEEDING MECHANISM FOR QUILTING MACHINES.

No. 579,614. Patented Mar. 30, 1897.

*Fig. 16.*

| Screw | Moves Frame | Controlling magnets | Controlling magnets |
|---|---|---|---|
| 7 | down | 18 | $18^c$—$18^d$ |
| 8 | up | 19 | $19^c$—$19^d$ |
| 10 | right | 118 | $118^c$—$118^d$ |
| 11 | left | 119 | $119^c$—$119^d$ |
| | | | |

— KEY TO THE PATTERN, —

Witnesses.
E. L. Smith
Claus Fabr Strandberg

Inventors.
Aurelius Steward,
George H. Dimond.

(No Model.) 12 Sheets—Sheet 12.
A. STEWARD & G. H. DIMOND.
FEEDING MECHANISM FOR QUILTING MACHINES.
No. 579,614. Patented Mar. 30, 1897.

Witnesses.
E. L. Smith
Claus Fabr Strandberg

Inventors.
Aurelius Steward,
George H. Dimond.

UNITED STATES PATENT OFFICE.

AURELIUS STEWARD AND GEORGE H. DIMOND, OF BRIDGEPORT, CONNECTICUT.

FEEDING MECHANISM FOR QUILTING-MACHINES.

SPECIFICATION forming part of Letters Patent No. 579,614, dated March 30, 1897.

Application filed January 4, 1897. Serial No. 617,930. (No model.)

*To all whom it may concern:*

Be it known that we, AURELIUS STEWARD and GEORGE H. DIMOND, citizens of the United States, and residents of Bridgeport, in the county of Fairfield and State of Connecticut, have invented certain new and useful Improvements in Feeding Mechanism for Quilting-Machines, of which the following is a specification.

Our invention relates to certain new and useful improvements in feeding mechanism for holding and presenting work of various kinds to suitable means for operating thereon, and while it may be applied with advantage to other arts, as wood carving or tracing or engraving of patterns upon metal or wood or fabric without substantial change, we have particularly designed the machine shown in the drawings for the purpose of feeding fabrics to the stitching mechanism of one or more sewing-machines, whereby patterns or figures in plain or fancy stitching may be automatically imparted to said fabric, as in the manufacture of bedquilts and similar productions.

As herein shown and described, the invention contains two independent and primary but coöperating mechanisms, the first of which is designed and is adapted to hold the goods in proper relation to the stitching or other operating mechanism and to move said goods relative thereto for the formation of the pattern, and the second of which is designed to control and vary the movements of the work holding and feeding devices whereby the desired pattern is produced. These two mechanisms, separately and in combination, constitute our invention in its broadest sense.

In a more specific sense our invention consists in the combination, with the devices for clamping the goods, of a plurality of feeding mechanisms operative either singly or in combination; in means for throwing said feeding mechanisms and each of them into and out of operation, said means being electrically controlled; in certain circuit closing and interrupting devices whereby the electrical connections are made and broken; in the arrangement of the several circuits; in the non-conducting belt and the means whereby the circuits are controlled by the perforations in said belt; in the means for throwing off and on one or more stitching mechanisms either simultaneously or alternately, and in the details of construction and combinations of elements which will hereinafter be enumerated in the description and specifically designated in the clauses of the claim which are hereunto annexed.

In order that those skilled in the art to which our invention appertains may fully understand the construction and operation thereof, we will describe the same in detail, reference being had to the accompanying drawings, which form a part of this specification and which show an operative machine made in accordance with our invention, said machine being designed for stitching quilts and the like.

Figure 2:
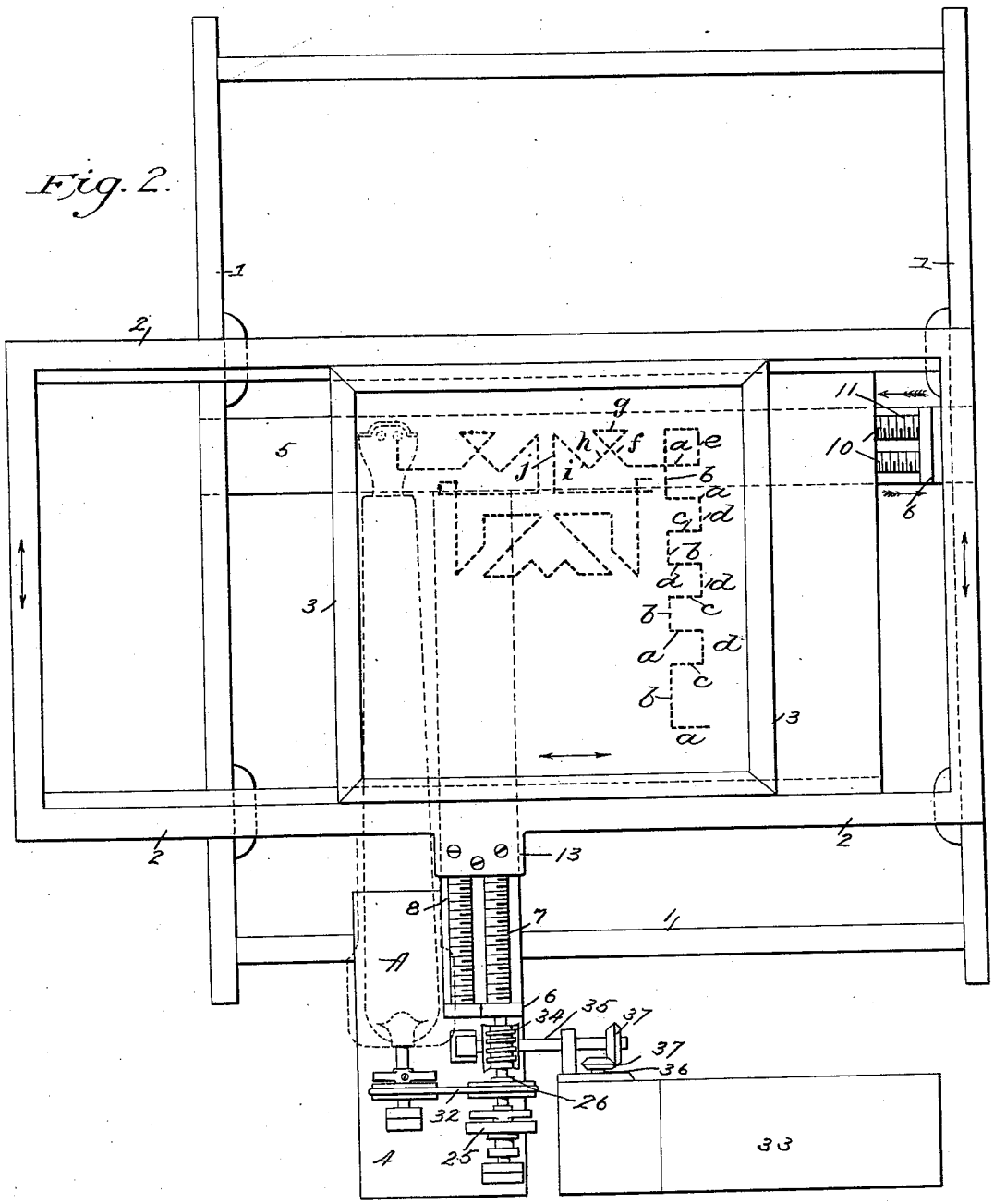
Figure 3:
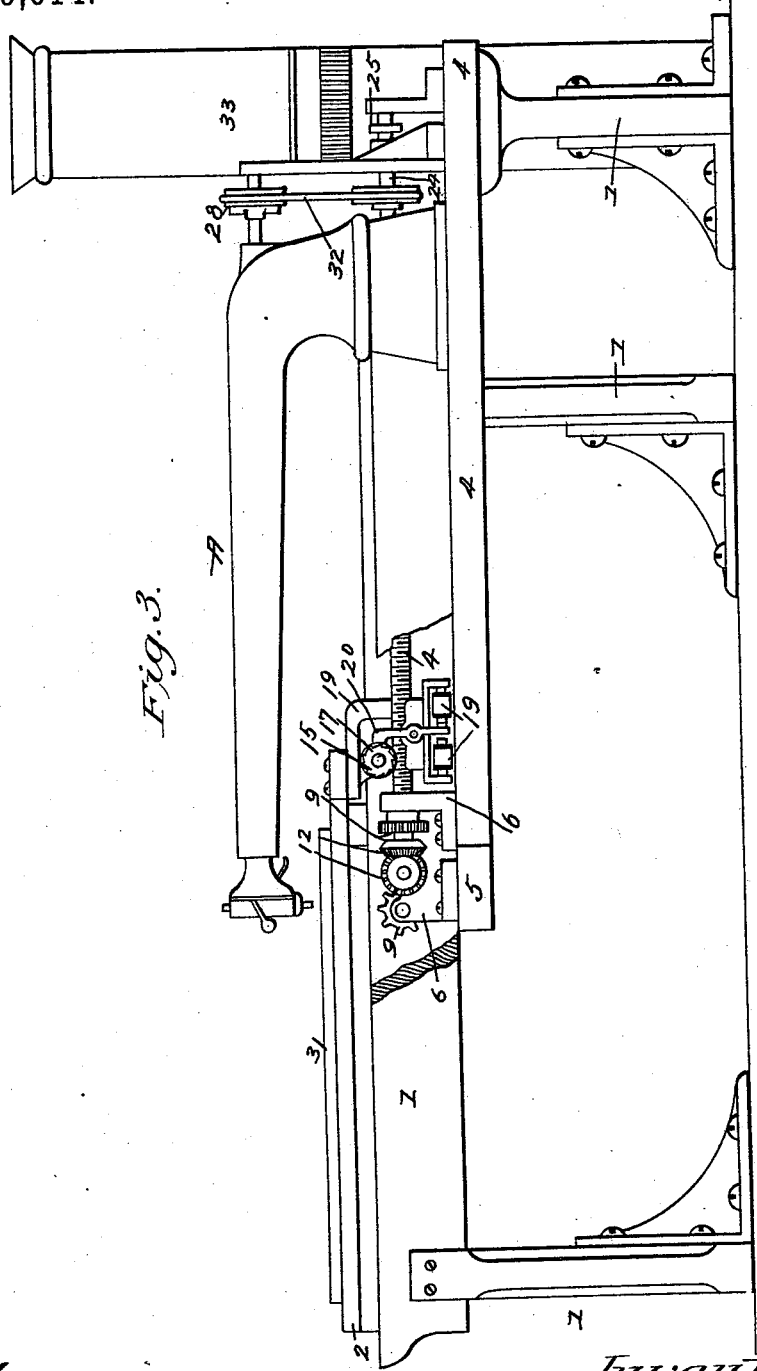
Figure 4:
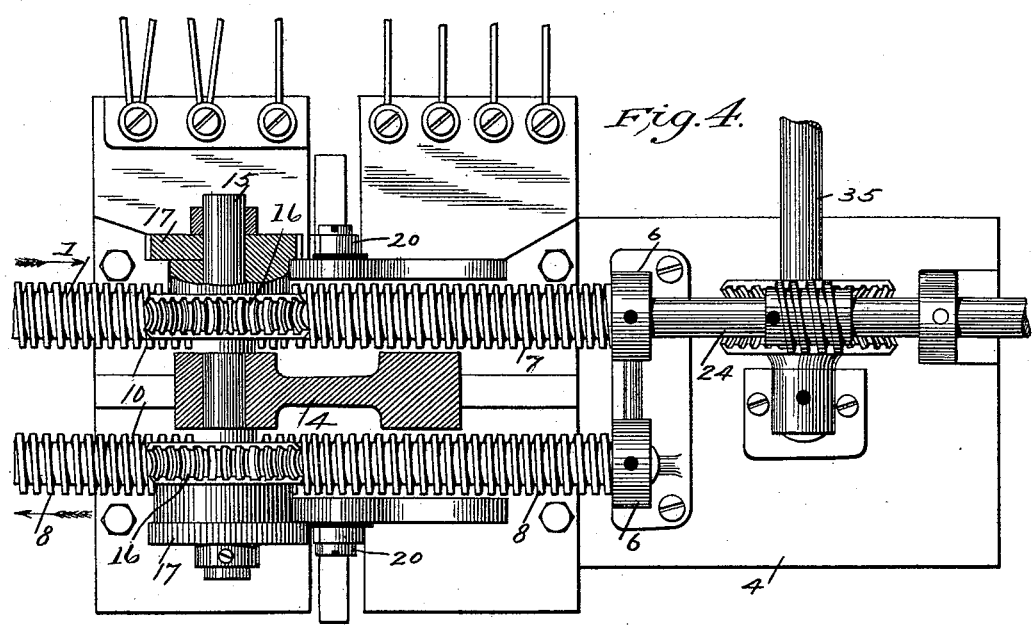
Figure 5:
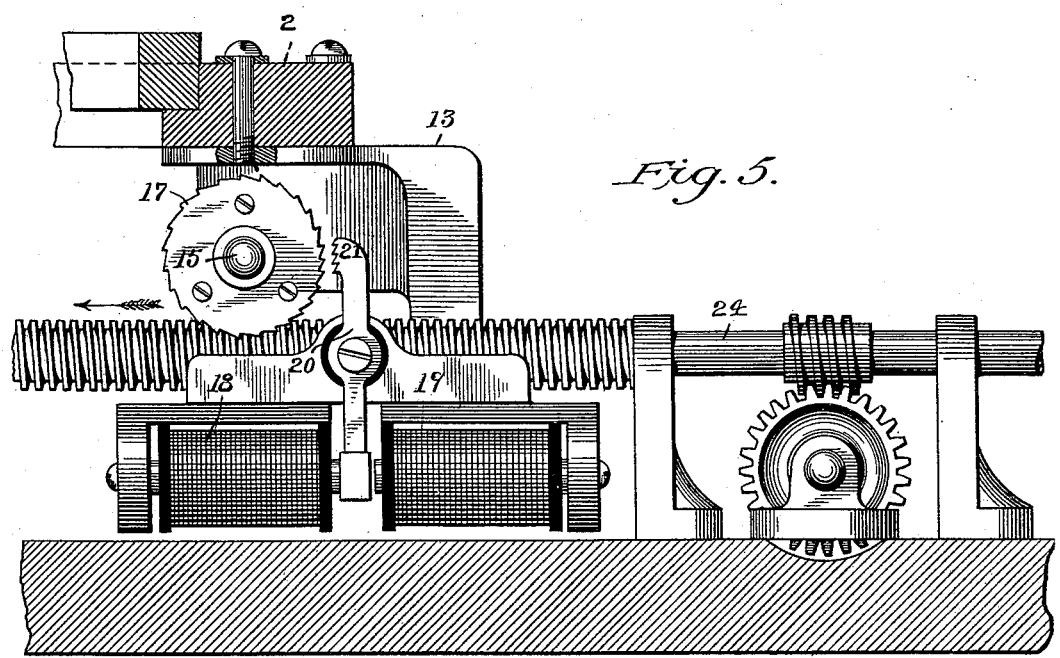
Figure 6:
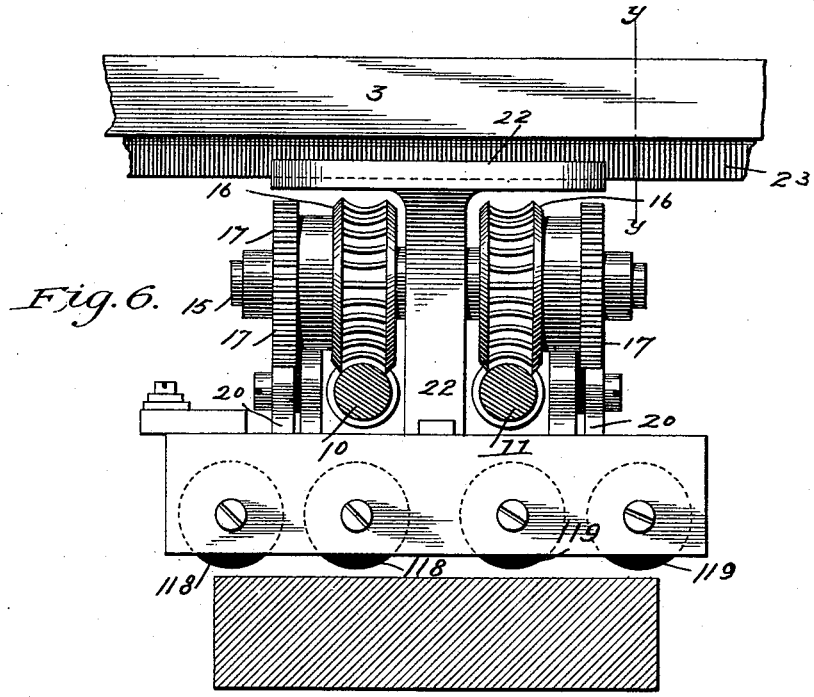
Figure 7:
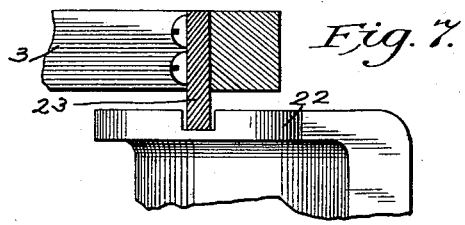
Figure 13:
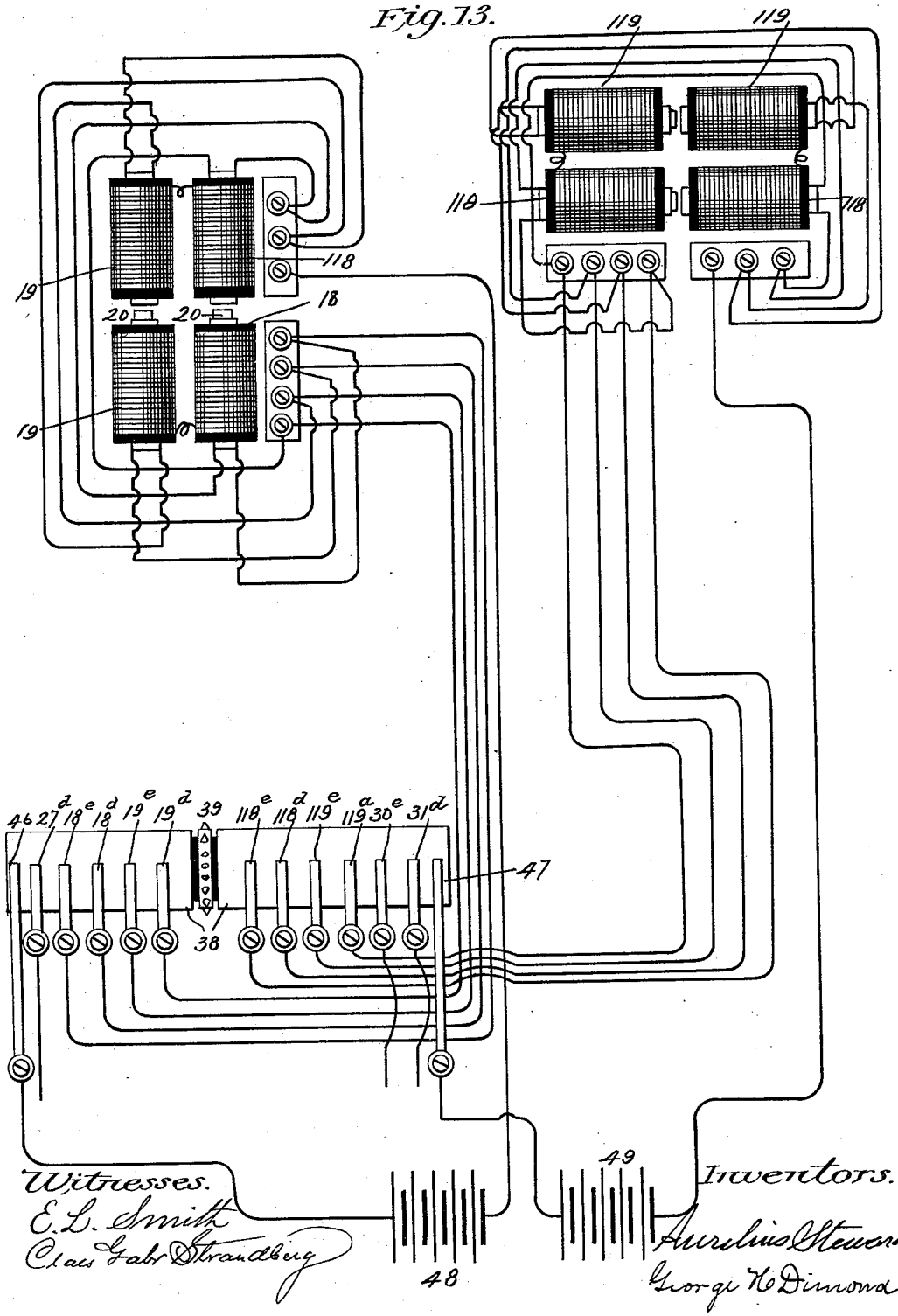
Figure 14:
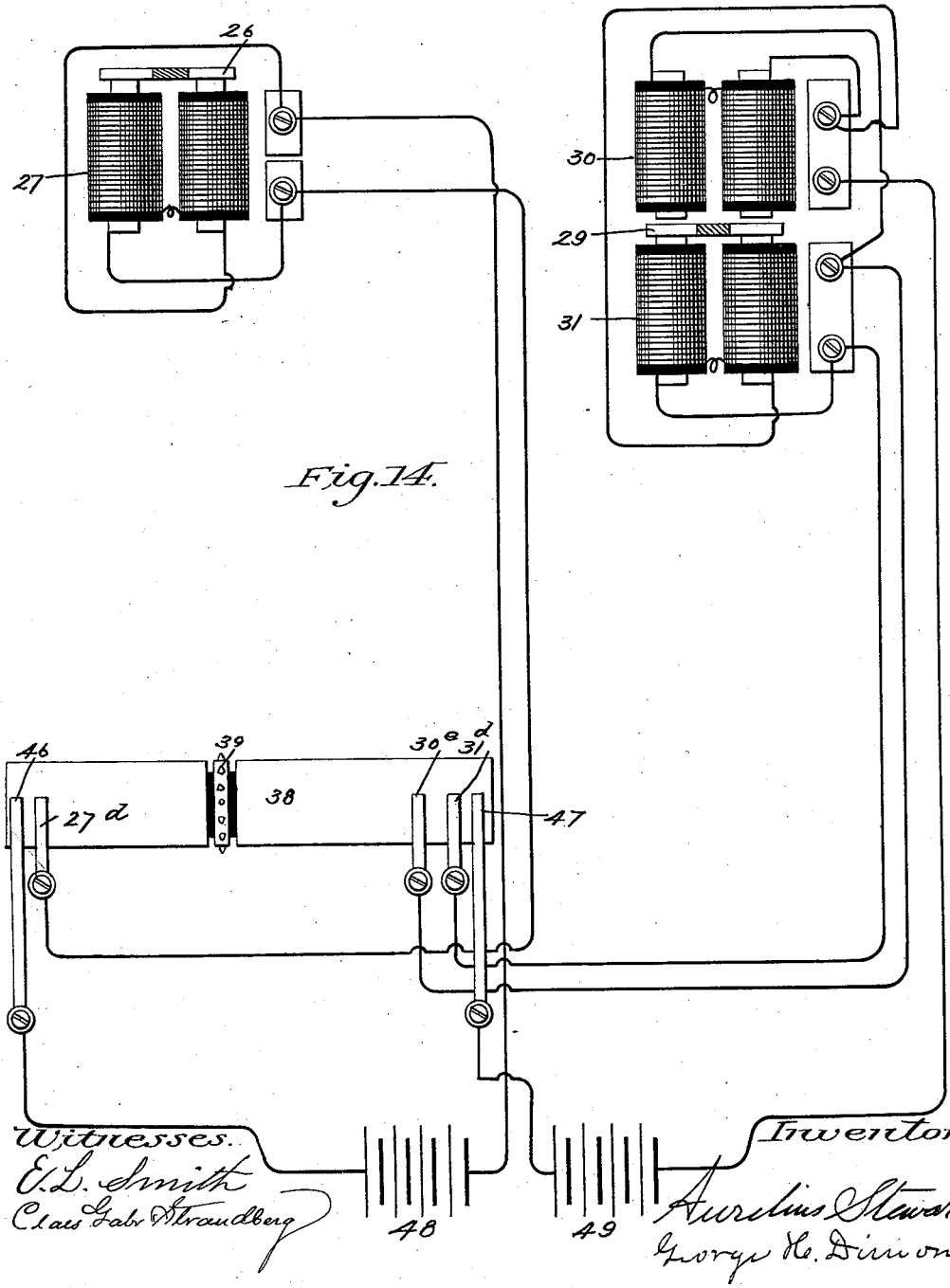
Figure 15:
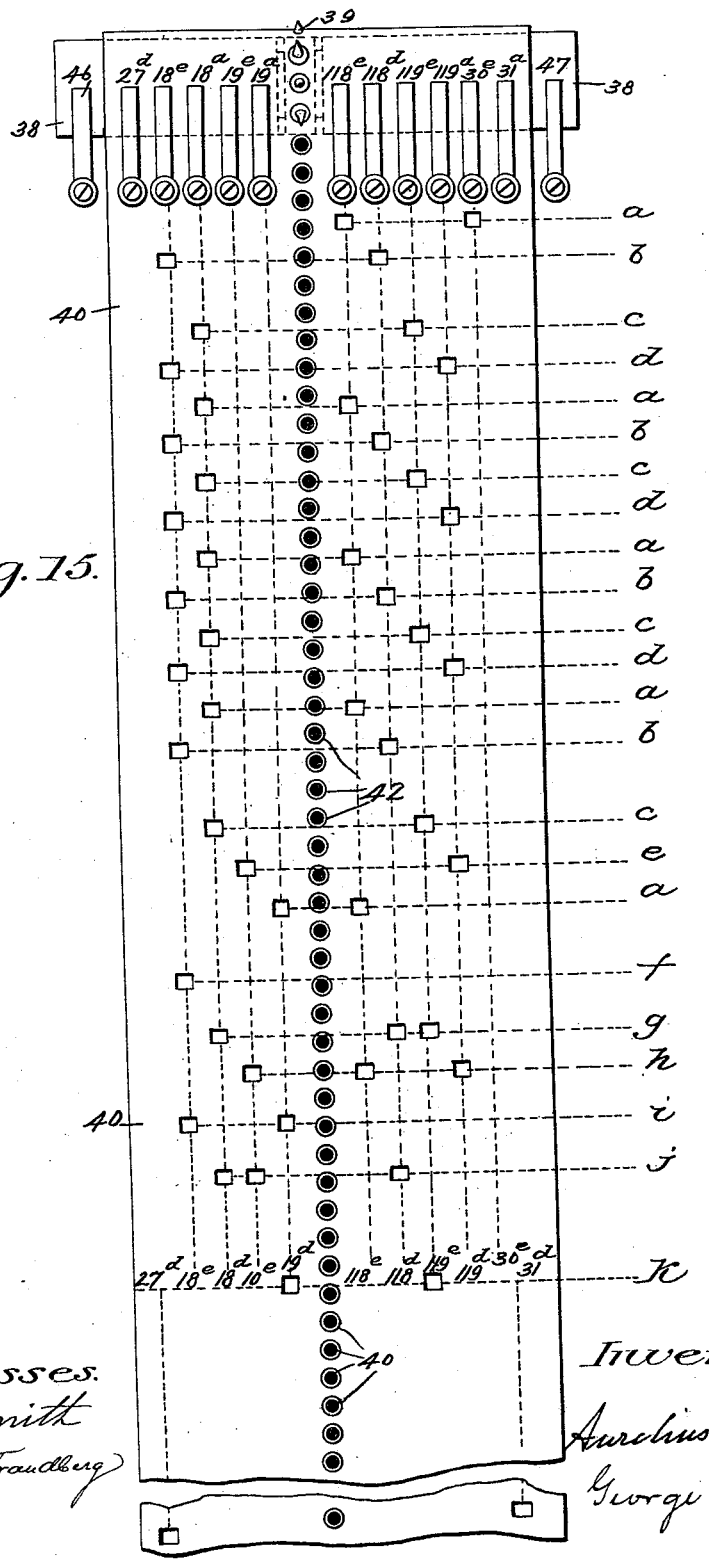
Figure 17:
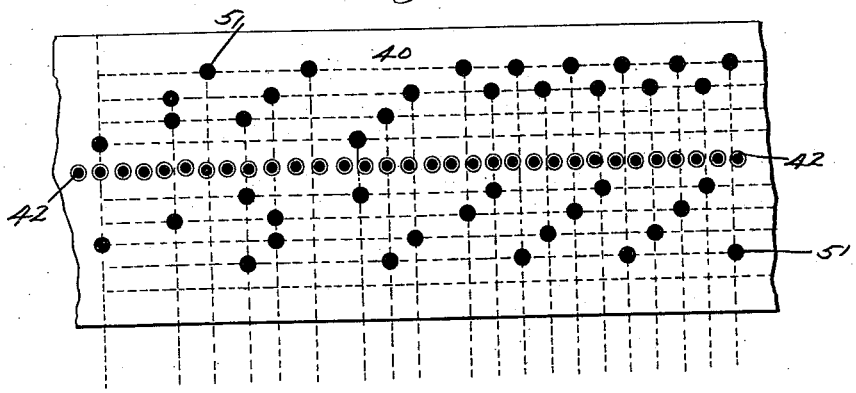
Figure 18:
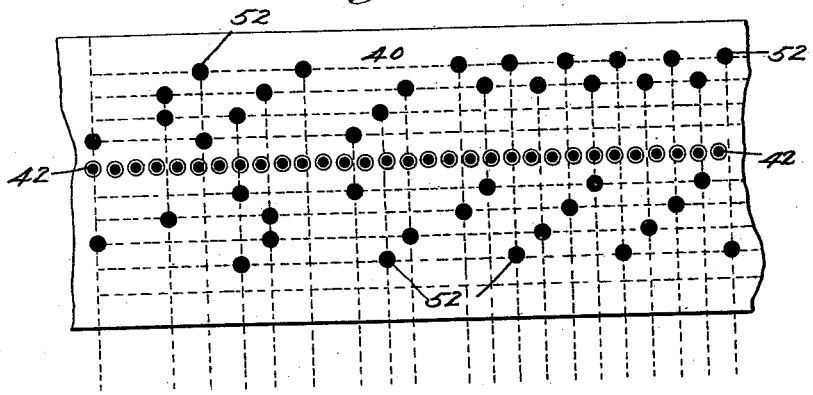

Figure 1 is a plan view of the entire machine, the clamping-frame and goods being in position to commence a pattern. A portion of the frame is broken away. Fig. 2 is a plan view in which a pattern is shown as substantially half completed. Fig. 3 is a side elevation. Fig. 4 is a detail plan view, partly in section, showing two of the feeding-screws and clutch mechanism connected therewith. Fig. 5 is a detail side elevation of the same parts shown in Fig. 4. Fig. 6 is a front elevation of clutch mechanism 22. Fig. 7 is a detail vertical section through Fig. 6 at the line $y\ y$. Fig. 8 is a detail horizontal section through the pattern-belt cabinet, showing the belt and the circuit-closing fingers in plan view. Fig. 9 is a detail elevation of the clutch whereby the stoppage of the whole machine is effected. Fig. 10 is a detail elevation of the clutch whereby the stitching mechanism is thrown into and out of action. Fig. 11 is a vertical longitudinal section through the pattern-belt cabinet and the chamber for the battery-jars. Fig. 12 is a detail central longitudinal section through a portion of the pattern-belt. Fig. 13 is a diagram showing the circuit connections of the magnets whereby the feed-clutches are operated. Fig. 14 is a like diagram showing the connections for the starting and stopping clutches. Fig. 15 is a detail diagrammatic plan showing the pattern-belt. Fig. 16 is a tabulated key whereby the pattern and the frame movements may be understood. Fig. 17 shows a modified construction of belt, and Fig. 18 a still further modification.

By comparison of Figs. 6 and 13 it would appear that they do not correspond. This may be explained, however, by the fact that Fig. 6 represents the actual mechanical construction, while Fig. 13 is merely diagrammatic and is not intended to represent anything further than the electrical arrangement.

Like numerals and letters of reference denote the same parts in all the figures of the drawings.

Referring now particularly to Figs. 1, 2, and 3, 1 represents a stationary frame adapted to form a base for the movable feeding-frames, of which there are two. The first of these, numbered 2, is rectangular, substantially twice as long as it is wide, and arranged to slide freely upon the base-frame 1, as indicated by the double arrow upon the left-hand margin of said frame in Fig. 1.

The second frame 3 is substantially square in plan view and is mounted upon ways in the frame 2, so that it may slide freely in the direction of the length of the latter, as is indicated by the double arrow on its lower margin, Fig. 1. Both these frames are open as to their centers, and the frame 3 is provided at its edges with suitable means for clamping and holding the goods, which may be of any usual or preferred construction and which we have therefore deemed it unnecessary to show in the drawings.

Secured to the frame 1 in a plane below the level of the sides of said frame on which the frame 2 is supported and moves are two stringers 4 5. (See Figs. 3, 4, and 5.) The stringer 4 extends from in front of the base-frame inward to the stringer 5, which latter traverses the base-frame and is secured thereto, as appears at Figs. 1 and 2. Journaled in brackets 6 upon the stringer 4 (see Figs. 4 and 5) are two parallel screws 7 and 8, which extend longitudinally of said stringer and at their inner extremities are connected by gears 9, so that they will rotate at equal speed, but in opposite directions.

Journaled in like brackets and extending longitudinally of the stringer 5 are two other screws 10 11, similarly connected together at their inner ends and adapted to derive motion from the screw 7 of the first-named pair through intermeshing beveled gears 12, as shown at Figs. 1 and 3. Thus we have secured upon the stringers four screws constantly in operation and adapted to transmit movement in either of four directions, said directions being designated by the small arrows marked at the sides of the screws, and to which it will be found convenient to refer hereinafter. The screw 7 is adapted to draw frame 2 toward the bottom of the sheet and the screw 8 to push it toward the top of the sheet. Screw 10 carries frame 3 to the right and screw 11 carries it to the left.

Secured to the edge of the larger feeding-frame 2 and depending therefrom is a bracket 13, which is shown in Figs. 4, 5, and 6, its central portion or shank 14 passing between the screws 7 8.

15 is a shaft passed transversely through the bracket above the plane of the screws. At either side of the shank of the bracket said shaft has journaled thereon a worm-gear 16, meshing with the screw on the same side, and each of these gears has secured thereto and adapted to revolve therewith a fine-toothed ratchet-wheel 17.

18 19 represent two pairs of electromagnets carried on the lower end of the bracket, one pair on each side, and the cores of each pair opposed, as is shown at Fig. 5. Just above these cores are hung dogs 20, pivoted to the bracket and having serrated faces 21, arranged opposite the ratchet-wheels heretofore referred to. The lower end of each of these dogs depends between the opposed magnet-cores, forming an armature which may be operated in either direction by means of the magnets—that is, by an attracting impulse of the proper magnet the dog may be forced to engage the ratchet with its serrated face or when so engaged it may be withdrawn out of contact, as seen at Figs. 4 and 5. In order that these dogs may not turn too freely on their pivotal points, we insert between each and the bracket some suitable friction device, as a spring-disk or pad of fabric, or both. We have shown the dogs in their simplest form for clearness of illustration; likewise the position of the magnets and their arrangement relative to the dogs. This construction and arrangement we deem immaterial, and we contemplate variations in construction according to circumstances. The purpose of these ratchet-wheels and the serrated dogs is to lock the worm-wheels fast as against rotation about the shaft on which they are journaled. This may be explained somewhat more in detail as follows:

Normally the ratchet-wheels and worm-wheels are loose on the shaft and are caused to revolve by the engagement of the latter with the constantly-traveling screws, the direction of rotation of the two wheels being of course opposite. So long as this state of affairs continues both the frames 2 and 3 stand still. When, however, either of the dogs is forced into engagement with its ratchet-wheel, said wheel is locked and with it is locked the worm-wheel. When so locked, the wheel still engages the screw, but as it cannot turn on its axis it is operated thereby after the manner of a half-nut, the frame being driven along by the screw until such time as the dog is withdrawn out of its engagement with the ratchet, when the worm-gear and ratchet-wheel are again revolved on the shaft by the screw without movement to the frame.

Another bracket 22, having worm-wheels, ratchet-wheels, and magnets 118 119 like those just described, is arranged to operate in connection with the screws 10 11 and through them to drive the frame 3. This bracket differs somewhat in its construction from the other, since it is obvious that it cannot be rigidly attached to the frame 3, because the frame 2, carrying frame 3, is adapted to travel in the line of screws 7 8. This we obviate by permitting the weight of the bracket and its attached parts to rest upon the screws 10 11 or upon a track parallel therewith, and we make the necessary connection between the bracket 22 and the frame 3 by slotting the top of the former and engaging therewith a depending strip 23, parallel with the screws 7 8 and extending along the whole edge of the frame 3. This permits the frame 3 to move freely with the frame 2, impelled by screws 7 or 8, and also to move independently along said frame driven by screws 10 or 11.

Power is applied to the screw 7 by a short shaft 24, axial with said screw, a clutch 25 being interposed between said shaft and the primary band-wheel or other source of power. Said clutch may be of any desired construction, but should be capable of operation by means of pivoted lever 26, whose upper end operates the clutch and whose lower end is in the field of an electromagnet 27, adapted to attract the lever and thereby disengage the clutch. In like manner the main shaft of the sewing-machine, which latter (lettered A) is shown in dotted lines at Figs. 1 and 2, in elevation at Fig. 3, and partly in detail in Fig. 10, is provided with a clutch 28, operated by a lever 29 and opposed electromagnets 30 31, so that, as will presently appear, the sewing mechanism may be thrown into and out of action irrespective of the other instrumentalities which are included in the organization as a whole. This is a feature of some importance, since in flossing or embroidery the machine is often required to stop after every stitch or series of stitches, the goods moving on meanwhile, and by this clutch the stoppage and starting are rendered automatic. The sewing-machine is preferably driven by a band 32. (See Figs. 1 and 2.)

We have not described the details of the clutches and their method of operation, since these are sufficiently apparent from the drawings, Figs. 9 and 10, and, furthermore, are not essential.

It is not vital that the clutches, and particularly the clutch 28, should be electrically operated, but for the reasons just set forth it is much to be preferred.

It is not necessary to describe the sewing-machine, since any stitch-forming mechanism or embroidery mechanism or either of the other instrumentalities referred to in the second paragraph of the specification may be used in connection with the frames. We have outlined, however, and prefer to employ a sewing-machine substantially like that shown in certain Letters Patent of the United States, No. 418,890, granted to us the 7th day of January 1890, and which is especially adapted for the purpose. A single sewing-machine is shown; but we purpose arranging several machines so as to operate on the same goods either simultaneously or in rotation. This is an obvious duplication of parts and neither needs further description nor illustration in the drawings.

The foregoing description includes the first branch of our present invention—namely, the arrangement of the frames and the means whereby movement is imparted thereto.

We will now describe the second branch of the invention, which relates to the means whereby the movements of the frames are directed and controlled.

A cabinet 33 is arranged adjacent to the frames. (See Figs. 1 and 2.) The lower portion of this cabinet is adapted to hold a certain number of cells of battery, and its upper portion furnishes accommodation for a traveling belt, whose purpose and construction will presently be described in detail.

To the shaft of the screw 7 a worm and gear 34 connects a shaft 35, whose extremity in turn operates a shaft 36 through beveled gears 37. The shaft 36 is journaled in the front of the cabinet above referred to and carries a roller 38, made of copper or other conductor of electricity and provided with projecting sprocket-teeth 39.

While it is not absolutely essential that the roller should form the means of completing the circuits presently to be described, we deem it preferable, because the rubbing contact with the rollers serves to keep the ends of the contact-fingers clean and bright, and, furthermore, because the dual use of the roller simplifies the construction. This cylinder, through its sprocket-teeth, serves to drive the belt 40, which is shown at Fig. 8 as stretched over tension-rollers 41 in the cabinet. Said belt is made of some flexible material, such as paper, which is non-conductive of electricity, and at its center, although their exact location is not material, we perforate it and insert a row of metal eyelets or grommets 42, (see Fig. 8,) into which the sprocket-teeth are adapted to take, so as to drive said belt.

In order that belts of different lengths may be accommodated in the cabinet, certain of the rollers should be made adjustable in some suitable way. We show the top line of rollers as journaled in a frame 43, having one end pivoted to the end wall of the cabinet and the other arranged to be lowered or raised by a screw 44. This device serves to take up the slack of the belt and insures an even tension thereto.

Upon the top of the front projection of the cabinet, as seen at Fig. 11, is a base 45, of non-conducting material, beneath which the belt passes just prior to its engagement with the tooth-carrying roller. Said base and roller are shown in plan view at Fig. 13, the belt being removed for the sake of clearness.

The base 45 bears a number of resilient fingers, which are secured thereto at their rear ends and project outward over its edge, so as to bear upon the roller with a yielding pressure and to rub upon the surface thereof when the roller is revolved or upon the surface of the belt when the latter is in position. Each of these fingers corresponds to and is adapted to control one of the magnets.

The finger $18^e$ is connected by a circuit-wire with one of the magnets 18 and the finger $18^d$ with the other magnet 18. The finger $19^e$ is likewise connected with one magnet 19 and the finger $19^d$ with the other. Finger $118^e$ operates one magnet of the pair 118 and finger $118^d$ the other. In like manner fingers $119^e$ and $119^d$ are connected with the magnets 119. Finger $27^d$ is in circuit with the magnets 27, which move the clutch-lever 26 to throw off the machine. Finger $30^e$ operates the magnets 30 and finger $31^d$ the magnets 31, which move the clutch-lever 29 either to throw the clutch in or out. The suffixed letters "e" and "d" denote, respectively, "engaging" and "disengaging," as indicating the function of the magnets.

46 and 47 are fingers which constantly engage the copper roller beyond the edges of the belt, and these are for the purpose of completing the circuits, the wires attached thereto forming a return common to all the magnets operated by that battery.

We show two batteries 48 and 49 for the purpose of dividing the source of energy; but it will of course be understood that one battery or other generator of electricity may be made to answer. It will be further understood that the use of the common return-wires for completing the circuits is immaterial and is merely done for economy of wire and simplicity, and a separate complete circuit for each magnet may be used instead.

Two diagrams representing the electrical connections are given for the purpose of showing the circuits in detail. This could not be done clearly upon one sheet, owing to lack of space. The clutch-circuits are broken off in Fig. 13 and the other circuits are omitted in Fig. 14.

The operation of the invention heretofore described may be conveniently explained by reference to the diagram of the belt, Fig. 15, in connection with the simple pattern shown in dotted lines at Fig. 2 and the key, Fig. 16.

The feeding mechanism is first started by hand by means of the clutch controlled by lever 26. Thereby all screws are caused to revolve and the several worm-wheels are driven idly upon their shafts by said screws, all the dogs being in their disengaged position and the belt being drawn along over its tension-rollers by means of the sprocket-teeth upon the driving-roller. The belt is at this point imperforate and the goods, properly stretched upon the frame 3, are in the relation to the stitching mechanism that is shown at Fig. 1, which represents the starting position.

The first change occurs when perforations $a$ in the belt come beneath the fingers $30^e$ and $118^e$ and permit said fingers by their spring action to make contact with the surface of the copper roller. This energizes two circuits and simultaneously produces the following results: The impulse through the connection of finger $30^e$ causes the magnets 30 to attract the lever 29, and thereby so operate the clutch to which said lever is connected as to start the stitching mechanism. The electrical impulse and attraction of the lever subsist only so long as the finger remains in contact, and this is governed by the length of the perforation in the belt. The lever, however, having been attracted, remains in that position by friction or other means until withdrawn. The contact of the finger $118^e$ completes the circuit, energizes one of the magnets 118, and the latter thereupon turns the dog on its pivot and drives its serrated face into engagement with the ratchet-wheel which forms a part of or is connected to the worm-wheel operated by the screw 10. This locks the worm-wheel and causes the frame 3 to be fed along to the right until the first horizontal line of stitching $a$ is made. (See Fig. 2.)

For convenience of reference we will mark each line of stitching and the perforations whereby the mechanism was caused to produce it with the same letter. The next two perforations permit the fingers $18^e$ and $118^d$ to close their circuits. The impulse of $118^d$ withdraws the dog out of contact with its ratchet, and thereby unlocks screw 10 and stops the movement of the frame 3 to the right. At the same time the ratchet-wheel on the screw 7 is thrown in by $18^e$ and said screw caused to draw the frame 2 and the frame 3 downward, making line $b$. The distance from perforations $b$ to $c$ determines the length of this line.

To make line $c$, fingers $18^d$ and $119^e$ are permitted by suitable perforations to make contact. That stops movement of frame 2 and imparts left-hand motion to the frame 3 by the screw 10. The line $d$ is made by the engagement of contacts $119^d$ and $18^e$. The lines from this point up to the point $e$ are substantially repetitions of the movements just described, and need not therefore be recited in detail, but the combinations of connections necessary to make the pattern are graphically represented by perforations indicated upon the belt diagram Fig. 15, so that they may be read, if desired, by reference to the numerals and letters on the drawings and the key in Fig. 16.

When the point $e$ is reached, the line $e$ requires for the first time the operation of $19^e$. The line $f$ requires the combined action of two screws to impart the proper movement to the frames. Movement by the screw 10 therefore continues, and thereunto is added the movement of the screw 7 by means of the circuit closed by $18^e$.

The line $g$ requires to produce it the action of contacts $19^d$ $118^d$ $119^e$, the two former to shut off the downward and right-hand movements imparted by screws 7 and 10 and the latter to throw in the screw 11.

The line $h$ requires $19^e$, $118^e$, and $119^d$, the latter to check the movement of screw 11 and the two former to impart the diagonal upward right-hand movement which is the resultant of the screws 8 and 10. In the line $i$ the contacts are simply $19^d$ $18^e$, the downward movement being substituted for the upward and the right-hand movement of screw 10, switched in by $118^e$ in the combination $h$, continuing on through $i$. The line $j$ is a simple upward movement, wherefore the combination required to produce it is $18^d$, $19^e$, and $118^d$.

Since the foregoing detail description comprehends all of the right-angled movements and enough of the resultant or combination movements so that the method of their production is reasonably clear, we deem it needless to pursue the pattern further, since the combination of perforations necessary to produce any given movement of the work may be instantly ascertained by reference to the key at Fig. 16, and by adding to the engaging perforations thus ascertained and in the same line therewith the throw-off or disengaging perforations appropriate to nullify the engaging perforations in the line of the previous movement. The last two perforations represent the throw-off of the driving-clutches—that is, $31^d$ would cut out the stitching mechanism, and shortly thereafter $27^d$ would stop the entire machine. As these are not in accord with the pattern they are separated by a broken line across the belt. These may be inserted at any point in the pattern for the purpose of stopping and starting the machine either for every stitch or at any desired interval, so that during the stoppage of the machine the work may be moved by the screws to such an extent as to present any desired part thereof beneath the needle. It is in this way that machines for embroidering and flossing will preferably operate.

The perforations of diagram 16 are perhaps not vertically spaced with perfect exactness, but in a general way they are intended to represent the relative lengths of the lines of stitching. For instance, the spacing between $b$ and $c$ is intended to bear the same relation to the space between $b$ and $d$ that the line $b$ bears to the line $c$. The same is intended to be true of the perforations adapted to control the production of lines $f$, $h$, and $i$.

In the manufacture of pattern-belts for use in connection with this machine the perforations may be made from a drawn pattern by measurements taken therefrom and perforations made corresponding to said measurements, or original patterns may be made by perforations in the belt. The precise form of pattern shown—namely, a belt—while preferable and most convenient, is not strictly essential.

We have shown two frames by means of which the movement of the fabric is effected, but we do not desire to be understood as limiting ourselves either to the precise form of frame shown or to any specific construction of frame, since this is not essential to the operation of our invention.

The magnets are shown as operating upon open circuits, but closed circuits can be used if found advantageous for any reason.

The belt is shown as perforated, but the contact with the conductive roller beneath might equally as well be made by the insertion through said belt of conductive studs or rivets 51, (see Fig. 17,) or if operating upon closed circuits a conductive belt having at intervals non-conductive interrupters, as 52, (see Fig. 18,) could be used. These in our judgment would be but the fair equivalents of the perforated belt, which we prefer on account of its cheapness and the simplicity of its preparation. We do not therefore wish to be understood as confining ourselves to the constructions herein shown, since these may be widely varied without essentially changing the character of the machine or departing from the principles governing our invention.

The pattern mechanism may be used with any kind of sewing-machine or an embroidery-machine having a multiplicity of needles, or, as heretofore explained, the goods may be operated upon by a plurality of sewing-machines thrown on and off by the pattern, according to the work to be accomplished.

The words "feeding devices" we employ not only to include screws operating in pairs and revolving in opposite directions, but oppositely-threaded screws revolving in the same direction.

The machine shown and described in this application is to be distinguished from ordinary embroidering-machines and automatic embroidering-machines. In such machines a plurality of needles puncture the fabric at a low rate of speed, say sixty times a minute. Ample time is therefore afforded for starting and stopping the screws or other mechanism which constitutes the feed. In the machine of this application, however, a single needle makes from nine hundred to twelve hundred stitches a minute, and therefore intermittent action of the feeding-screws or similar devices by starting and stopping them is entirely out of the question if perfect and uniform work is to be produced.

We claim—

1. In a feeding mechanism, the combination, with the movable frames and the constantly-rotative screws arranged adjacent to the frames, of the worm-gears carried by the frames and meshing with the screws aforesaid, and clutches and means for operating the same, whereby said worm-gears may be held as against rotation so as to engage said screws after the manner of half-nuts, substantially as described.

2. In a feeding mechanism, the combination, with the movable frames and the constantly-rotating screws arranged adjacent thereto, of worm-gears connected to the frames, and normally rotated by engagement with said screws, a ratchet moving with each of said worm-gears, and a clutch adapted to engage said ratchet and thereby lock it and its gear as against rotation, substantially as described.

3. In a feeding mechanism, the combination, with the movable frames and the constantly-rotating screws arranged adjacent thereto, of worm-gears connected to the frames and engaging and adapted to be normally rotated by said screws, clutches adapted to hold said worm-gears as against rotation, and electromagnets adjacent to and adapted to operate said clutches in both directions, substantially as and for the purpose set forth.

4. In a feeding mechanism, the combination, with the frames, and the screws arranged adjacent thereto, of the worm-gears connected to said frames and operated by said screws, clutches arranged adjacent to said worm-gears and adapted to lock said gears as against movement about their axes, electromagnets whereby said clutches are adapted to be operated into and out of engagement, and a traveling pattern adapted to make and break the magnet-circuits, whereby said magnets and therethrough the positions of the clutches are controlled, substantially as set forth.

5. In a feeding mechanism, the combination, with the work-holding frame and the constantly-revolving screws adjacent thereto, of brackets secured to the work-holding frame, the worm-wheels journaled on the brackets, electromagnets supported upon said brackets, and means interposed between the magnets and the worm-wheels, whereby said worm-wheels may revolve freely or may be detained as against rotation, substantially as described.

6. In a feeding mechanism, the combination, of the clamp or frame, of the depending bracket secured or connected thereto, the screws adjacent to said bracket, and means for rotating said screws, the worm-wheels journaled on the bracket and meshing with the screws, the ratchet-wheels carried by said worm-wheels, a gripping-pawl adapted to engage and hold each of the ratchet-wheels, and electromagnets adjacent to and adapted to control the position of said gripping-pawl, and suitable circuits in which said magnets lie.

7. In a machine of the character described, the combination, with the frames, means for moving said frames, and the pattern-belt, of an inclosing receptacle for said belt, rollers over which said belt is tensioned, and means as described for moving certain of said rollers whereby equal tension may be imparted to belts of different length.

8. The combination, with the perforated pattern-belt, of the driving-roller having sprocket-teeth engaging said belt and imparting power thereto, rollers 41 over which said belt travels, and means, such as the screw 44, for varying the position of certain of the rollers, substantially as described.

9. In a machine of the character described, the combination, with the work-holding frames, and the plurality of constantly-revolving screws adjacent to said frames, but normally disconnected therefrom, of clutches interposed between the frames and screws, and electromagnets adapted to effect the movements of the clutches, substantially as set forth.

10. In a machine of the character described, the combination, with the work-holding frames, and the constantly-revolving screws adjacent to, but normally disconnected from said frames, of clutches interposed between the frames and the screws, an electromagnet adapted to effect the engaging movement of the clutch, a similar magnet adapted to effect the disengaging movement of the clutch, and a pattern adapted to control the circuits in which the magnets lie, whereby the coupling and uncoupling may be automatically effected.

11. In a machine of the character described, the combination, with the work-holding frame, of a plurality of constantly-revolving feeding-screws adjacent to said frame, a clutch mechanism arranged between the frame and each of the screws, each clutch mechanism being in constant engagement with a screw, electromagnets whereby said clutch mechanisms are thrown into and out of operative connection, a controlling-pattern, and suitable circuits operated thereby, substantially as described.

12. In a machine of the character described, the combination, with a bed or frame 1, of two movable frames 2 and 3, mounted thereon, two pairs of parallel constantly-rotative screws secured upon said bed, means for driving all four of said screws at uniform speed, and clutches interposed between one pair of screws in the frame 2, like clutches interposed between the other pair of screws of the frame 3, and means for effecting the engagement between said frames and screws, substantially as described.

13. The combination, with the bed 1 carrying the two pairs of screws arranged each pair at right angles to the other pair, of the frame 2, a clutch interposed between said frame and each screw of one pair, the frame 3 and similar clutches adapted to connect it to the other pair, means for driving the screws at equal speeds, and a pattern and electrical circuits and magnets controlled thereby, whereby the coupling and uncoupling of the frames are effected, substantially as described.

14. In a machine of the character described, the combination, with suitable work-holding frames, and a plurality of constantly-moving feeding devices arranged beneath and parallel to said frames, but normally disconnected therefrom, of clutches interposed between said frames and the feeding devices, and electromagnets adapted to effect the movements of the clutches, substantially as set forth.

Signed at Bridgeport, in the county of Fairfield and State of Connecticut, this 1st day of December, A. D. 1896.

AURELIUS STEWARD.
GEORGE H. DIMOND.

Witnesses:
E. L. SMITH,
CLAES GABR. STRANDBERG.